United States Patent [19]
Nakajima

[11] Patent Number: 4,586,674
[45] Date of Patent: May 6, 1986

[54] FISHING REEL
[75] Inventor: Hideki Nakajima, Sakai, Japan
[73] Assignee: Shimano Industrial Company Limited, Osaka, Japan
[21] Appl. No.: 475,927
[22] Filed: Mar. 16, 1983
[30] Foreign Application Priority Data Mar. 26, 1982 [JP] Japan ................... 57-49287

[51] Int. Cl.⁴ ...................... A01K 89/02; H02K 49/04
[52] U.S. Cl. ........................... 242/84.52 B; 242/84.53; 310/93; 310/105
[58] Field of Search ...................... 242/84.52 B, 84.53; 310/93, 105; 188/267

[56] References Cited
U.S. PATENT DOCUMENTS 2,361,239 10/1944 Ransom ................ 310/93 X
2,517,926 8/1950 Ransom ................ 242/84.52 B
2,550,861 5/1951 Ransom ................ 242/84.52 B

FOREIGN PATENT DOCUMENTS 214801 5/1958 Australia ............ 242/84.52 B

Primary Examiner—Stuart S. Levy
Assistant Examiner—Joseph J. Hail, III
Attorney, Agent, or Firm—Stevens, Davis, Miller & Mosher

[57] ABSTRACT

A fishing reel having a spool and a magnetic brake for reducing an overrun of the spool is provided with an adjuster to adjust the braking effect of the brake, a stopper holding the adjuster in its adjusting position, and a lever for releasing the holding of adjuster to cause a maximum braking effect on the spool.

8 Claims, 4 Drawing Figures

FISHING REEL

FIELD OF THE INVENTION

This invention relates to a fishing reel, and more particularly to a fishing reel having a spool and a magnetic brake for reducing an overrun of the spool.

BACKGROUND OF THE INVENTION

Conventionally, a fishing reel has been well-known which supports a spool rotatably to a reel body and is provided with a drive mechanism for driving the spool and a clutch mechanism interposed within a driving force transmitting unit at the drive mechanism, the clutch mechanism being engaged to rotatably drive the spool through the drive mechanism to thereby wind up a fishing line onto the spool, and disengaged to allow the spool to freely rotate, thereby permitting casting of the line.

The fishing line, when cast, is drawn out of the spool by virture of the weight of a fishing rig at the end of the line, at which time the rotational speed of the spool becomes faster than the drawing speed of the line to cause backlash, whereby the line happens to get twisted or enters between the spool and the reel body. Hence, a brake means for the spool generally is provided to prevent the occurrence of backlash.

The brake means usually employs a centrifugal brake which moves its brake shoe into slidable contact with a brake drum to exert the braking action. Accordingly, there exists a problem in that the brake shoe, when worn, changes the braking effect.

In order to solve this problem, a fishing reel has been proposed which is provided with a magnet brake comprising a magnet and an electric conductor, one of the magnet and conductor being made rotatable together with the spool and the other being supported to the reel body. The one member at the spool rotates to allow the magnetic flux to rotate and generate an eddy current and is subjected to a reaction force against rotation, under the Fleming's left-hand rule, to thereby exert a braking action on the spool. The other member at the reel body is made movable relative thereto, and an adjuster is provided axially outwardly of the spool and is operated to adjust the relative position of the magnet with respect to the electric conductor.

Since this magnet brake includes no contact portion there is no problem with a changing braking effect due to wearing of a friction member. The adjuster is operated to adjust the braking effect in proportion to the number of rotations of the spool. The braking effect, however, cannot be adjusted in response to a change in the rotational speed of the spool. In other words, for example, when a large braking effect is set prior to casting with respect to the number of rotations of the spool when backlash occurs, backlash can be minimized but the large braking action is exerted on the spool at the initial stage of casting, resulting in casting to a smaller distance. On the contrary, when the braking effect is set to a minimum with respect to the number of rotations of spool at the beginning of casting, the line can be cast to a greater distance, but backlash is apt to occur.

SUMMARY OF THE INVENTION

In the light of the above problem, this invention has been designed. An object of the invention is to provide a fishing reel which can adjust the braking effect on the spool as desired by an angler prior to casting, change, during casting, the braking effect from the initially adjusted intensity to a maximum to thereby permit casting of the line to a greater distance, and adjust the braking effect by a simple manipulation during casting, thereby reliably preventing the occurrence of backlash.

In other words, the basic principle of this invention is to adjust the braking effect corresponding to a change in the number of rotations of spool. The fishing reel of the invention, which supports the spool rotatably to the reel body, is provided with a magnet brake comprising magnets and an electric conductor which serves to reduce an overrun of the spool, a magnet holder carrying the magnets and movable in the direction of the magnetic attraction of the magnets, an adjuster which operates the magnet against the attraction of the magnets to adjust the braking effect to a minimum with respect to the spool, a stopper means for maintaining the brake effect adjusting position by the adjuster, and a release means which is provided at the stopper means for releasing the adjusting position thereof so that the magnet holder moves toward the position where the braking effect becomes a maximum, by virtue of the attraction of the magnets.

This invention is characterized in that the release means is operated to maximize the braking effect of the magnetic brake. An angler can, prior to casting, desirably adjust the braking effect on the spool at the beginning of casting and also the release means, during the casting, is operable to intensify the braking effect on the spool so that it is greater than that at the beginning of casting.

Accordingly, while the braking effect at the initial stage of casting is adjusted to a minimum, it is intensified when backlash is apt to occur, thereby ensuring the prevention of the occurrence thereof.

Thus, the rotational resistance against the spool at the initial stage of casting can be minimized resulting in casting to a greater distance.

These and other objects of the invention will become more apparent in the detailed description and examples which follow.

DETAILED DESCRIPTION OF THE INVENTION

Figure 1:
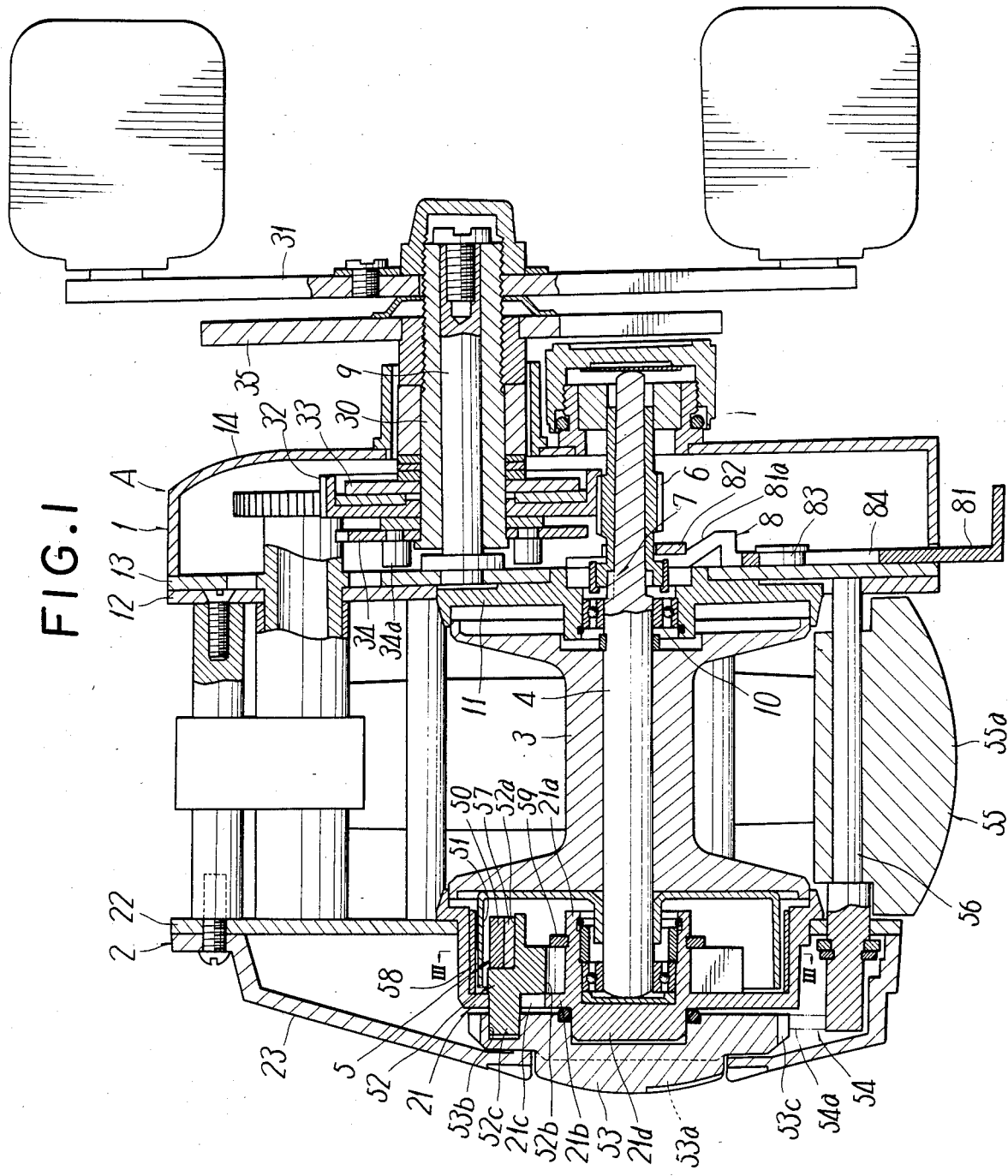
FIG. 1 is a cross-sectional plan view of an embodiment of a fishing reel of the invention.

In the drawings, reference A designates a reel body comprising a pair of first and second side frames 1 and 2 opposite to each other at a given interval, the first side frame 1 comprising a side plate 12 having at the center a bearing housing 11, a doubling plate 13 attached to the outside of side plate 12, and a cup-like cover 14 attached to the outside of doubling plate 13, and the second side frame 2 comprising a side plate 22 having at the center a bearing housing 21 and a cup-like cover 23, the bearing housing 21 accommodating therein a magnet brake to be discussed below.

A spool shaft 4 having a spool 3 is journalled to the first and second side frames 1 and 2 through bearings 10, a pinion 6 is supported rotatably and axially slidably to an extension of spool shaft 4 projecting within the first side frame 1, and a clutch 7 is provided adjacent pinion 6 and is engaged or disengaged by a clutch lever 81 at a clutch operating mechanism 8.

A handle shaft 30 for a drive mechanism is supported rotatably through a support shaft 9 between the doubling plate 13 and the cover 14 and projects at one axial end therefrom to fix a handle 31 and supports at the other axial end a master gear 32, a friction plate 33 and a return plate 34 having a plurality of clutch pins 34a.

The friction plate 33 and return plate 34 are fitted onto the handle shaft 30 rotatably together therewith and the master gear 32 is fitted freely onto the handle shaft 30 to be rotated by the handle shaft 30 through the friction plate 33.

In addition, an adjuster 35 screwing with one axial end of handle shaft 30 can adjust a press-contact strength of friction plate 33 with the master gear 32.

The clutch 7 comprises flat faces provided at an axially intermediate portion of spool shaft 4 and a cylinder having a not-round inner surface engageable with the flat faces, the cylinder disengaging from the flat faces by operating of clutch operating mechanism 8 to allow the spool 3 and spool shaft 4 to freely rotate.

The clutch operating mechanism 8 comprises a clutch yoke 82 carrying the pinion 6 and always biasing it in the engaging direction of clutch 7, the furcate clutch lever 81 having a biasing portion 81a for the yoke 82, and the return plate 34, the clutch lever 81 being supported to the doubling plate 13 in relation of being reciprocable perpendicularly to the spool shaft 4 through a pin 83 at the doubling plate 13 and on elongate bore 84 at the lever 81, and biased by a return spring (not shown) in a direction of backward movement. The clutch lever 81 is pushed to axially move the clutch yoke 82 to thereby move the pinion 6 in the disengaging direction of clutch 7. While, the handle 31 rotates to hit a contact (not shown) at the utmost end of lever 81 with the clutch pin 34a at the return plate 34 to return the lever 81 by the return spring, thereby biasing the pinion 6 by the yoke 82 to engage the clutch 7. In addition, the clutch lever 81 is swingable around the pin 83 and has an engaging portion at the utmost end, which engages with a cutout stepped portion at the doubling plate 13 to hold the lever 81 at its forward movement termination.

Figure 2:
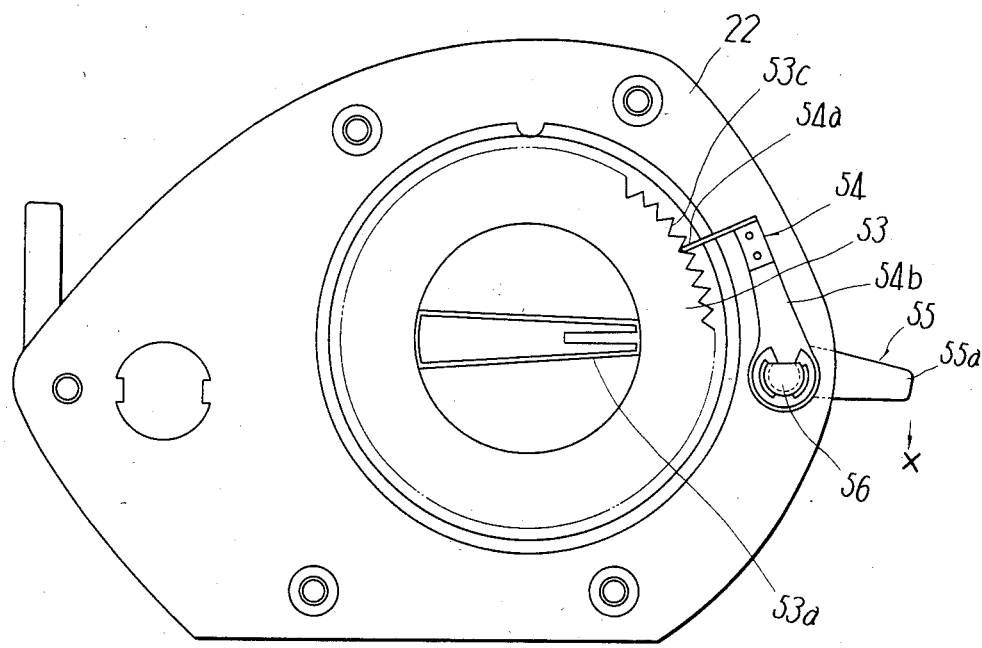
FIG. 2 is a side view of the FIG. 1 embodiment, from which a cover is removed.

The reel constructed as foregoing, as shown in FIGS. 1 and 2, is provided within the bearing housing 21 with a magnet brake 5 comprising magnets 50 and an electric conductor 51, the electric conductor 51 being cylindrical and mounted concentrically to the spool shaft 4 or spool 3, the magnets 50 being held at the outer peripheral holding portion 52a at the magnet holder 52 of non-magnetic material having at the center an elliptic shaft bore 52b, and being opposite to the inner periphery of conductor 51. The magnet holder 52 is fitted at the elliptic shaft bore 52b onto the outer periphery of a support cylinder 21a at the central portion of bearing housing 21 in the relationship that the holder 52 is movable radially outwardly of support cylinder 21a, in other words, in the direction of the attraction of magnets 50 for minimizing a clearance between the magnets 50 and the conductor 51 and maximizing the braking effect on the spool 3.

A guide bore 21c for radially guiding the holder 52 is provided at the bottom wall 21b of bearing housing 21 and away from the center of support cylinder 21a, through which bore 21c an engaging projection 52c provided at one side of holder 52 is inserted. A disc-like adjuster 53 having a rotatably adjusting knob 53a is supported rotatably onto a support portion 21d provided at the outer surface of bottom wall 21b at the bearing housing 21, and at an inside surface of adjuster 53 is provided a cam groove 53b in the form of a circular arc and extending circumferentially and shifting gradually radially inwardly from the outer periphery of adjuster 53, so that the engaging projection 52c at the holder 52 is made engageable with the cam groove 53b, the knob 53a being exposed from the cover 23 to be operable from the exterior.

The adjuster 53 is rotated against the attraction of magnets 50 to shift the engaging projection 52c with respect to the cam groove 53b, thereby moving the magnet holder 52 radially inwardly of support cylinder 21a, that is, in the reverse direction to the attraction direction of magnets 50. Thus, the magnets 50 held on the holder 52 are adjustable in the position where the clearance between the magnets 50 and the conductor 51 becomes the maximum, in other words, the braking effect becomes a minimum.

Furthermore, the fishing reel constructed as foregoing is provided with a stopper means 54 which maintains the adjuster 53 in its position for adjusting the braking effect, and with a release means 55 for releasing the adjusting position maintained by the stopper means 54. The stopper means 54, as shown in FIGS. 1 and 2, mainly comprises a number of serrations 53c provided at the circular outer periphery of adjuster 53 and an arm 54b having an engaging strip 54a engageable with each serration 53c and being pivoted to the side plate 22.

The engaging strip 54a in the above construction is formed of an elastic plate member is engageable at the tip with each serration 53c.

The adjuster 53 is operable, even while the engaging strip 54a is engaging with the serration 53c, because the strip 54a bends to temporarily leave the serration 53c during the operation of adjuster 53. Also, the adjuster 53 stops its rotation to hold its adjusting position by the engagement resistance of strip 54a to the serration 53c.

The arm 54b is fixed to one axial end of a support shaft 56 supported rotatably to the side plate 22 and constituting a part of release means 55, and can turn following the rotation of support shaft 56 so as to disengage from the serration 53c.

The release means 55 is mainly of a lever type and comprises a lever 55a larger in width and fixed to the support shaft 56 supported between the first and second side frames 1 and 2 as shown.

Figure 3:
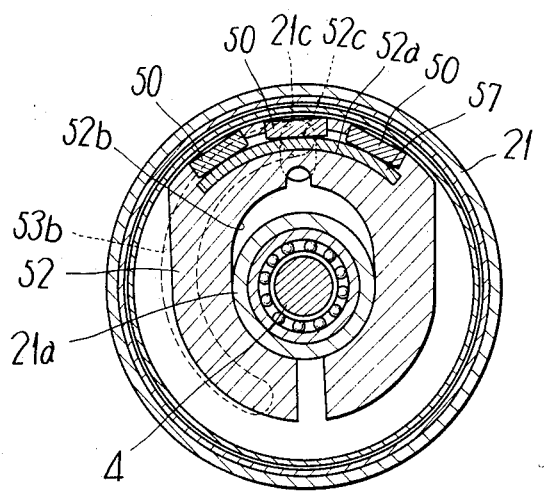
FIG. 3 is a sectional view taken on the line III—III in FIG. 1.
Figure 4:
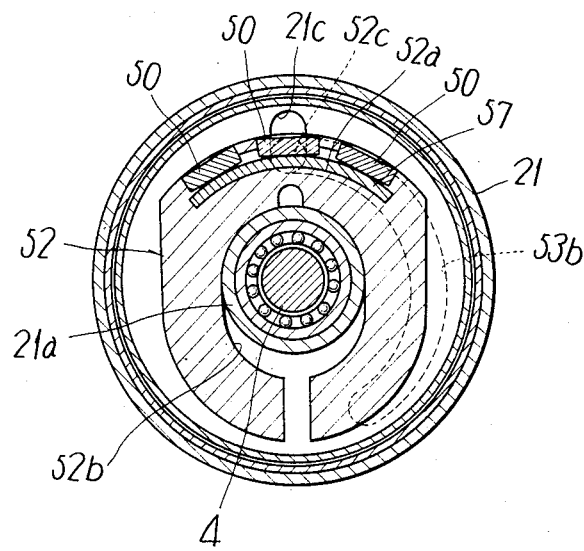
FIG. 4 is a sectional view showing the state where the braking effect is adjusted to a minimum, corresponding to FIG. 3.

The magnets 50 are held at a portion of the outer periphery of magnet holder 52, are made adjustable in position in a range from the minimum clearance (in FIG. 3) with respect to the conductor 51 to the maximum clearance (in FIG. 4), and comprise one N-pole magnet and two S-pole magnets at both sides thereof as shown, so that the holder 52 is attracted by the magnetic force of magnet 50 toward the position where the clearance between the magnets 50 and the conductor 51 becomes a minimum.

Also, the magnets 50 are inserted in a holding recess 52a formed at the outer periphery of holder 52 and fixed with an adhesive or the like through a magnetic plate 57 of a circular arc. Alternatively, the holder 52 may be formed of synthetic resin and the magnets 50 may be embedded into the holder 52 when molded.

The guide bore 21c at the bearing housing 21 is made elongate in the moving direction of holder 52, thereby allowing the holder 52 to move only radially with respect to the support cylinder 21a, but not to rotate with respect thereto.

When an angler intends to cast a line by operating the clutch lever 81 to disengage the clutch 7 and allow the spool 3 to freely rotate, the conductor 51 attached to the spool 3 or spool shaft 4, rotates together therewith within the magnetic field of magnets 50, so that the direction of the magnetic flux passing through the conductor 51 changes in the rotation direction. This change in the magnetic flux generates an eddy current in the conductor 51, whereby a magnetic force in the reverse direction to the rotation direction of conductor 51 is generated under Fleming's left-hand rule, thereby exerting a braking action on the spool 3.

The braking effect by the magnet brake 50 is controllable by the adjuster 53. In detail, an operating force from rotation of adjuster 53 is transmitted from the cam groove 53b to the holder 52 through the engaging projection 52c, so that the holder 52, following a shift of the engaging position of cam groove 53b with the engaging projection 52c, moves radially of the support cylinder 21a against the attraction of magnets 50. Hence, the magnets 50 at the holder 52 are changeable in position with respect to the conductor 51 in the range from the minimum clearance location to the maximum clearance location, thereby changing the magnetic flux density applied to the conductor 51. Therefore, the braking effect on the spool 3 is adjustable to a minimum and also the adjuster 53 can be held by the stopper means 54 in the adjusting position for the braking effect, thus enabling adjustment of the braking effect by an angler's choice prior to casting. Accordingly, even when the braking effect is adjusted to a minimum prior to casting, the lever 55a at the release means 55, during the casting, is operable in the direction of the arrow X in FIG. 2 so as to release the adjusting position by adjuster 53, thereby enabling adjustment of the braking effect to a maximum. In detail, the lever 55a is operated to disengage the engaging strip 54a from the serration 53c, and the holder 52 is attracted by the magnetic force of magnets 50 radially outwardly of support cylinder 21a, so that the magnets 50 shift from the adjusted position to the minimum clearance position with respect to the conductor 51 and the braking effect can be changed from the minimum to the maximum. Hence, when the fishing rig arrives in the vicinity of the surface of the water, the above operation by the angler can change the braking effect to a maximum to thereby reliably eliminate the occurrence of backlash.

Incidentally, in this embodiment, since the lever 55a is disposed between the first and second side frames 1 and 2, the angler can operate the lever 55a only by extending, for example, the thumb of his hand gripping a fishing rod carrying the reel body A.

In addition, in FIG. 1, reference numeral 58 designates a magnetic ring provided at the inner periphery of bearing housing 21 opposite to the outer periphery of conductor 51, and 59 designates a C-like-shaped snap ring for restraining the holder 52 from axial movement with respect to the support cylinder 21a.

Alternatively, the magnet holder 52 may be moved circumferentially or axially of the spool 3 to be adjusted in position with respect to the conductor 51.

Also, the magnet brake 5 may alternatively be so constructed that the conductor 51 is moved radially, circumferentially or axially of spool 3 to be adjusted in position with respect to the magnets 50. In this case, the magnets 50 are mounted on the spool 3 or spool shaft 4 and the conductor 51 is supported to, for example, the support cylinder 21a at the bearing housing 21 in relation of being movable radially, circumferentially or axially of support cylinder 21a. Besides the adjustment of relative positions of magnets 50 to conductor 51 for changing the braking effect, the magnets may be disposed inside and outside the peripheral portion of conductor 51, the magnets at one side being fixed to the bearing housing 21, those at the other side being supported to the holder 52, thereby adjusting the relative positions of magnets 50 at one side to those at the other side.

Alternatively, the magnets 50 in the embodiment shown in the drawings may be provided at the outer periphery of conductor 51.

Also, the magnet holder 52 may be biased in the direction of maximizing the braking effect by use of a spring together with the magnets 50.

The stopper means 54 is not particularly defined of construction and need only be constructed to hold the adjusting position by the adjuster 53 for the braking effect.

Furthermore, the release means 55 is preferably disposed between the first and second side frames 1 and 2, but may alternatively be disposed at the second side frame 2 side or the first side frame 1 side, which is not defined, but preferable to be made operable by the angler's hand gripping the fishing rod carrying the reel body A. Also, the adjuster 53 may alternatively be movable axially or radially of the spool 3.

As seen from the above, the fishing reel of the invention is provided with the magnet brake comprising the magnets and electric conductor, the adjuster for adjusting the braking effect of the magnet brake, the stopper means of maintaining the adjusting position by the adjuster for the braking action, and the release means for releasing the stopper means from the adjusting position, whereby the angler, during the casting, can operate the release means simply by his hand gripping the rod carrying the reel body, thereby adjusting the braking effect with respect to the number of rotations of the spool from the previously adjusted intensity to the maximum. As a result, while the rotational resistance to the spool at the initial stage of casting is minimized to thereby permit casting to a greater distance, backlash can reliably be eliminated.

Although several embodiments have been described, they are merely exemplary of the invention and not to be construed as limiting, the invention being defined solely by the appended claims.

What is claimed is:

1. A fishing reel comprising: a spool; a reel body rotatably supporting said spool; a drive mechanism supported to said reel body and having a clutch for driving said spool; a magnetic brake for reducing an overrun of said spool; said magnetic brake comprising an electric conductor rotatable together with said spool and a magnet holder having at least one magnet opposite to said conductor, one of said conductor and magnet holder being movable in the direction of the attraction of said magnet to said conductor to a position where a braking effect on said spool is a maximum intensity; an adjuster for moving one of said conductor and magnet relative to the other in the opposite direction of the attraction caused by said magnet so that the braking effect by said magnet is adjusted toward a minimum intensity; and a stopper means for holding said conductor and magnet at an adjusted position relative to one another which is set by said adjuster, said stopper means being provided with a release means which releases the adjusted position held by said stopper means to cause movement of one of said conductor and magnet holder to said position where the braking effect is a maximum intensity.

2. A fishing reel according to claim 1, wherein said magnet holder is movable in the direction of attraction of said magnet, said adjuster operating to move said magnet holder in the opposite direction to the direction of attraction of said magnet to thereby adjust the braking effect, so that said adjusted position held by said stopper means is released upon actuation of said manually operable member to return said magnet holder to a position where the braking effect becomes the maximum.

3. A fishing reel according to claim 2, wherein said magnet holder returns to the position where the braking effect becomes the maximum by the attraction of said magnet.

4. A fishing reel according to claim 1, wherein said adjuster is supported rotatably to said reel body and a portion thereof is exposed at an outer surface thereof outwardly from said reel body, said exposed portion having a knob for rotatably operating said adjuster.

5. A fishing reel according to claim 4, wherein said adjuster has a round outer periphery and a plurality of serrations thereon, said stopper means comprising an engaging strip engageable with each of said serrations.

6. A fishing reel according to claim 5, wherein said stopper means is provided with an arm for supporting said engaging strip and a support shaft for supporting said arm, said support shaft being supported to said reel body.

7. A fishing reel according to claim 6, wherein said reel body is provided with first and second side frames, said support shaft being supported between said first and second side frames, said support shaft between said first and second side frames having said release means.

8. A fishing reel according to claim 1, wherein said manually operable member is a lever.

* * * * *